UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR WORKING UPPERS OVER LASTS.

1,189,979.           Specification of Letters Patent.         Patented July 4, 1916.

Application filed July 20, 1912. Serial No. 710,669.

*To all whom it may concern:*

Be it known that I, RONALD F. McFEELY, a citizen of the United States, residing at Beverly, in the county of Essex and State of Massachusetts, have invented certain Improvements in Machines for Working Uppers Over Lasts, of which the following description, in connection with the accompanying drawings, is a specification, like reference characters on the drawings indicating like parts in the several figures.

This invention relates to machines for use in the manufacture of boots and shoes and is embodied in improved mechanism for pulling-over or for both pulling-over and lasting a shoe.

A very important feature of this invention consists in means for outdrawing an upper. This is herein shown as embodied in a mechanism which includes corner grippers and means for actuating them to tension the toe portion of the upper outwardly from the last. The movement is made to take place obliquely, forwardly and laterally. This operation takes the stretch out of the toe of the upper transversely of the shoe as well as longitudinally. Machines as heretofore built have attempted to take the stretch out of the toe by pulling it lengthwise, the upper back of the toe being pulled transversely. By pulling the toe of the upper lengthwise and also transversely, throughout its length, I can remove the stretch more completely and condition the upper freer from wrinkles preparatory to the toe lasting operation. It should be noted that it is practical to effect a small economy of the most expensive portion of the shoe upper by taking the stretch completely out of the toe tip or cap portion thereof which is not required to possess any elasticity in the use of the ordinary shoe. Therefore toe tips or caps for shoes to be made on this machine can be cut smaller than heretofore. The outdrawing means is operated automatically in time relation with the other operations and by mechanism which includes features of novelty. Means is also provided for manually outdrawing the upper additionally, if found desirable, after the automatic stretching.

In combination with the outdrawing mechanism, which tensions the toe portion of the upper and holds it free from wrinkles and from those excessive strains in one direction relatively to the strains in transverse directions which cause incipient wrinkles, toe lasting wipers or plates are arranged to manipulate the upper into finally lasted position over the bottom of the toe. In this coöperative action the outdrawing mechanism holds the upper tensioned outwardly in radial lines from the toe while the wipers, preferably rising from below the plane of the shoe bottom in rubbing contact with the shoe, bend the upper inwardly to the sides of the last and when the shoe edge is reached further bend the outwardly tensioned upper between the last and the grippers over upon the innersole.

An important feature of the invention is found in the new gripper control. This as herein embodied comprises means by which, as the lasting operation of the wipers progresses, the outdraw may be relieved and, at the will of the operator, the grippers may be released from the upper which they have held outspread to maintain it free from wrinkles while the wipers were advanced. This gripper control means includes a treadle which withdraws a latch to relieve the tension and later operates the jaw trippers of the grippers to free the stock.

Another feature of this invention is found in the improved side wipers and their controlling mechanism and still another in an adjustment of the last supporter by which it can be made more satisfactorily to sustain the shoe.

These and other features of this invention, including certain combinations of parts and more important details of construction, will now be described in connection with the drawings and then pointed out in the claims, except the novel method herein disclosed which is claimed in divisional application Ser. No. 66,319, filed Dec. 11, 1915.

The driving shaft 2 of the machine carries the usual cams 3 and 4 for updrawing the toe and side grippers; also the cam block 5 through a cam track 6 in which the arms 8, carrying the side wipers and tackers, are drawn over the shoe and then spread again, said cam block 5 having further the cam face 9 which is connected with the side clamp arms 10 by which the shoe is supported for the side tacking and the toe lasting operations. These, with other parts of the machine, are constructed and arranged as in said prior patent, except as hereinafter set forth, and no detail description is therefore necessary in this specification in order to enable the present invention to be understood.

Figure 2:
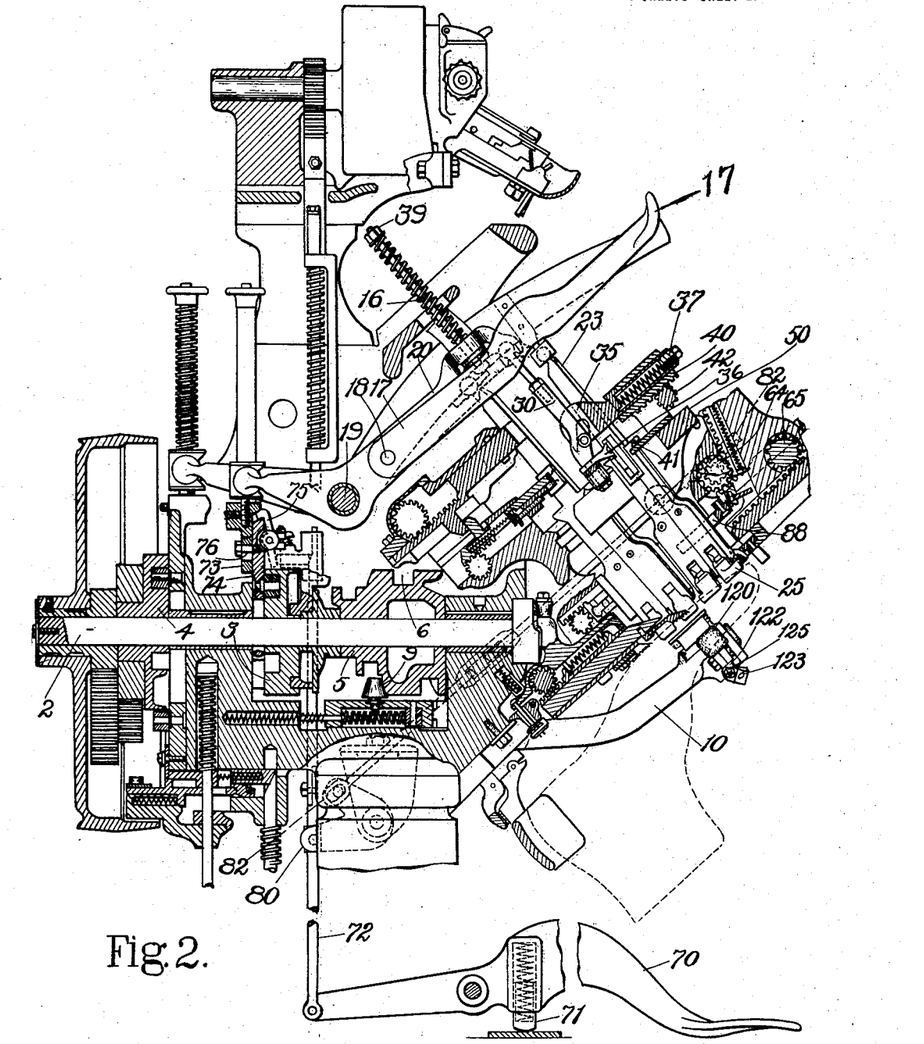
Fig. 2 is a vertical longitudinal section.
Figures 3, 10:
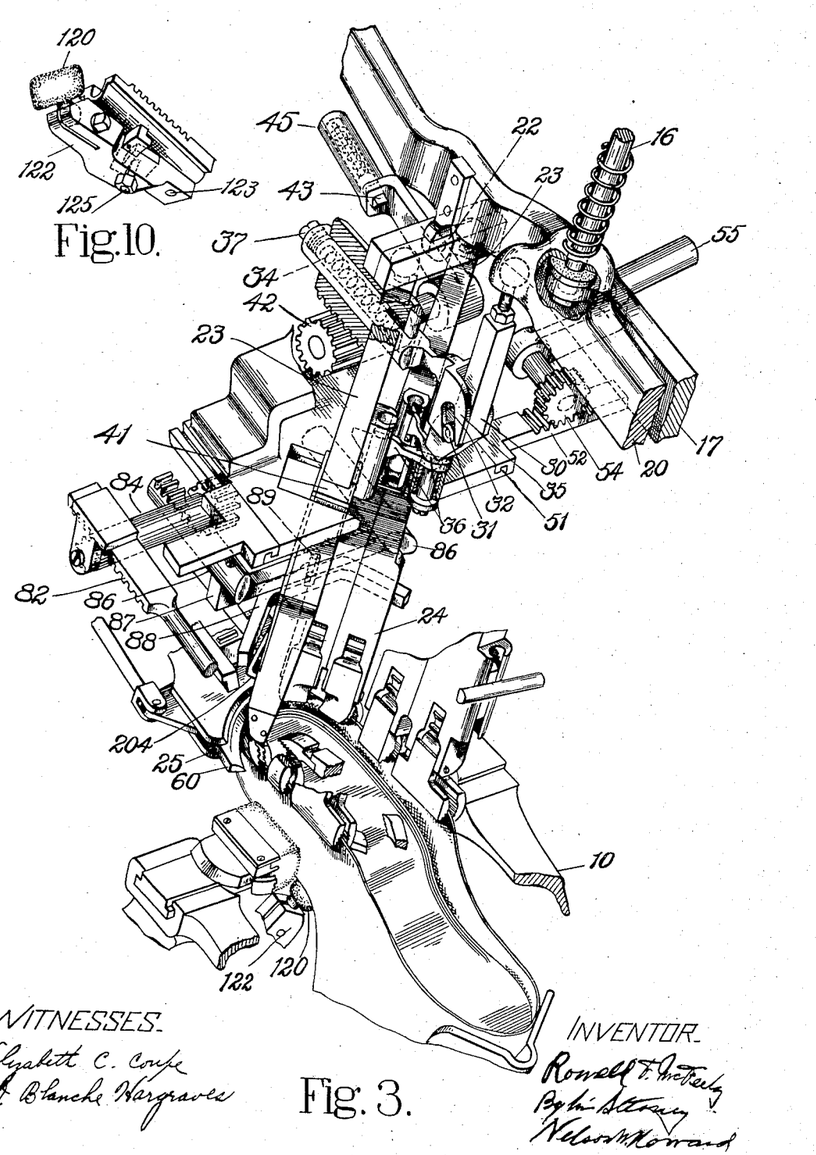
Fig. 3 is a perspective view looking down from the rear into the gripper mechanism.
Fig. 10 is a perspective detail of one of the adjustable devices which support the shoe for the operation of the lasting and tacking devices.
Figures 4, 5, 11, 12, 13, 14, 15, 16:
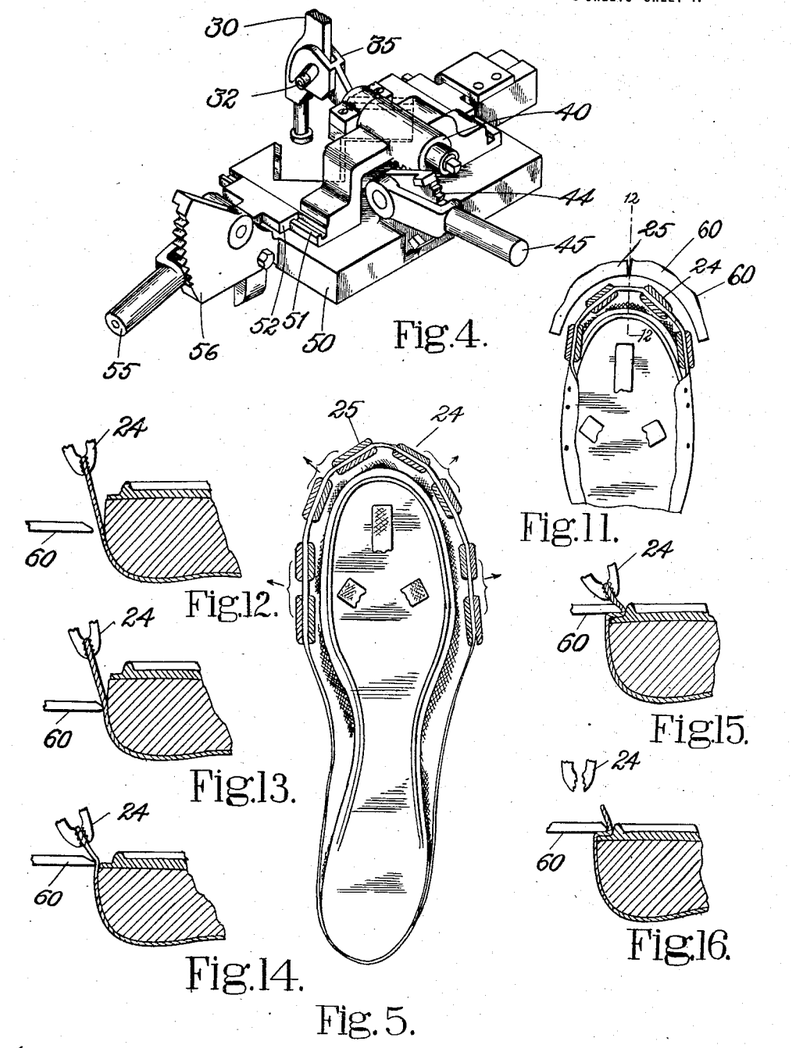
Fig. 4 shows the gripper adjusting mechanism.
Fig. 5 shows diagrammatically the grouping of the grippers and the direction of their outward action.
Fig. 11 is a plan view similar to Fig. 5, showing the condition after the upper has been laid over and tracked at the sides and just prior to the operation of the toe wipers.
Fig. 12 shows a longitudinal vertical section of Fig. 11.
Figs. 13, 14, 15 and 16 show successive stages in the manipulation of the wipers and the grippers in lasting the toe.
Figure 6:
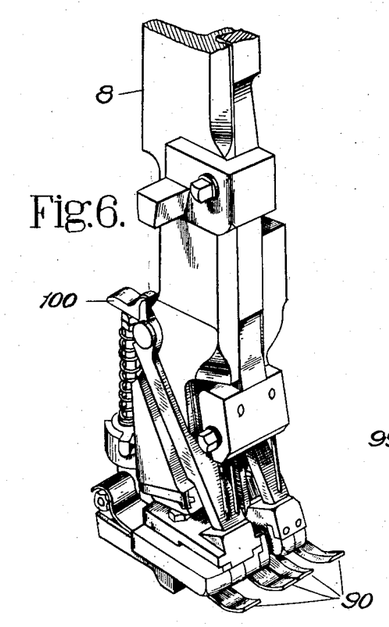
Figs. 6, 7, 8 and 9 are views of the side wiping and fastening mechanisms.
Figure 7:
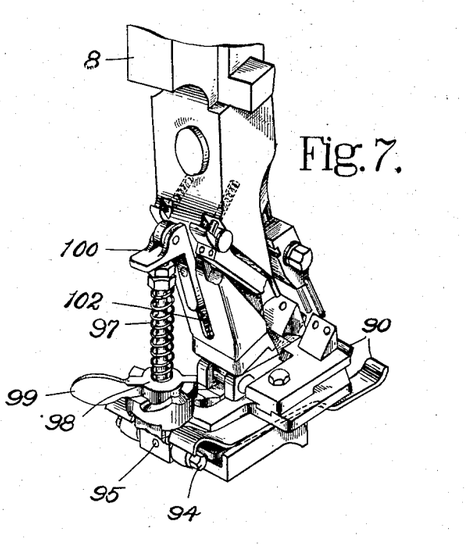

In place of the single toe gripper of said patent, which gripper engaged the upper for a narrow width at the middle of the toe, this invention provides corner grippers, herein shown as two pairs of grippers engaging the upper at each corner of the toe, see Figs. 2, 3 and 5, and preferably not at the middle of the toe. Moreover, these corner grippers, which seize the upper at a plurality of separate points but are subject to common control, have imparted to them spreading or outdrawing movements by which they stretch the upper widthwise across the top of the toe end of the last, as well as forwardly.

Referring now to Figs. 2 and 3, the toe gripper lever 20, extending forwardly from a preferably unyielding connection with the cam 3, is fulcrumed at 19 and at 18 pivotally supports an arm 17 which it overlies and to which it is yieldingly connected by a spring rod 16. This arm 17 pivotally supports at 22, Fig. 3, a crosshead or equalizer lever from the opposite ends of which are suspended the operating bars 23 of the right corner pair of grippers 24 and the left corner pair of grippers 25. Ball suspension heads of the bars 23 permit the two pairs of grippers on each bar to have turning movement about a common axis extending lengthwise of the bar and located between the pairs of grippers to adapt their position to the shape of the corner of the last. These pairs of grippers are or may be constructed as in my earlier United States Letters Patent 1,030,522, granted June 25, 1912, to close and to uplift through equalizing devices which permit them to adapt themselves to the thickness and the extensibility of the portions of stock acted upon by them. These grippers 24, 25 are arranged to engage the shoe upper at the corners of the last as in Fig. 5 and are set at an angle to one another as in that figure.

The right and left corner grippers are uplifted through the equalizing connection at 22 with arm 17 which is in turn yieldingly uplifted by lever 20. This lever, it will be recalled, is unyieldingly moved and from its front end is pivotally suspended a link 30 having roll studs 31 that can move lengthwise of forwardly inclined slots 32 in a bracket 35. This link 30 is therefore unyieldingly actuated but the bracket 35 is backed up by a stiff spring 34. The lower end of the link 30 forms a pivot bearing for arms 36 that constitute struts guided at their outer ends in guideways in the gripper operating bars 23, 23. This connection from lever 20 to the bars 23 operates to force the bars and the corner grippers carried thereby outwardly away from the corners of the last when the grippers are yieldingly upraised whereby the upper is outdrawn from the last to stretch it. It will be noted that in the illustrated machine the outdrawing movement of the corner grippers is effected in diverging, forwardly directed paths which extend at an angle to the gripping planes of the gripper jaws. The spring 34 renders the outdraw non-rigid and the swivel mounting of the struts 36 permits the outdraw to take place in the direction of least resistance so that the stretch is taken out of the toe portion of the upper uniformly in the direction of the width and length of the toe portion of the upper which is thereby thoroughly freed from wrinkles. The springs through which the outdraw and the updraw are effected are relatively adjustable by nuts 37 and 39.

Figure 1:
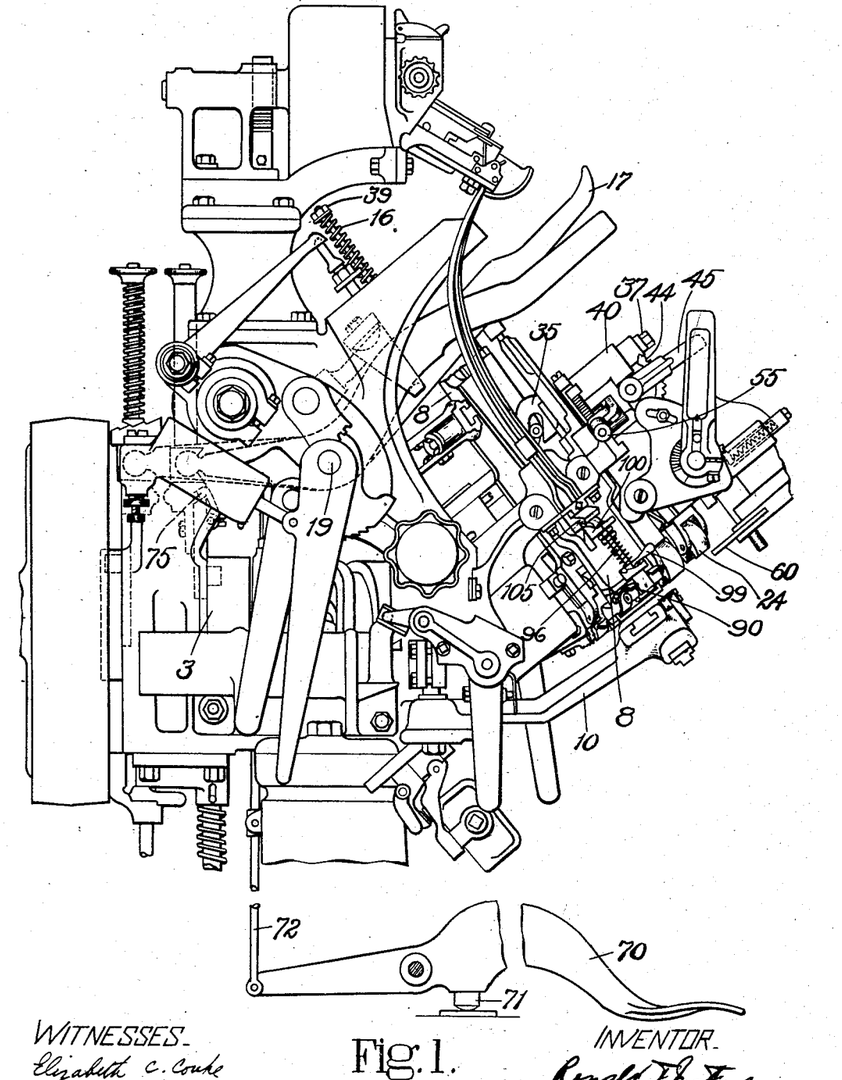
Figure 1 is a side elevation showing the present improvements applied to a machine of the type shown in United States Letters Patent No. 1,135,949, granted April 13, 1915, on my earlier application.

The bracket 35 is mounted, yieldingly by its spring 34, in a slide 40, a lower face of which is a rack, and is adjustable before the operation of the machine, or is movable while the grippers hold the upper, by a pinion 42 to which is connected a hand lever 45 carrying a spring locking pawl 43, Fig. 3, to engage a fixed segment ratchet 44, Fig. 1, for securing the bracket 35 in the outspread position to which it is moved. The slide 40, see Fig. 4, has angularly diverging slots within which the corner grippers are guided during the outdraw, with provision for some lateral play, and inclines 41 on the sides of each gripper return it to central lateral position in the guideway when the gripper is lowered to shoe receiving position as provided for in my earlier United States Letters Patent 1,030,264, granted June 18, 1912. The pinion 42 is journaled in and the ratchet 44 is formed on a block 50, Fig. 4, over which the slide 40 can be moved longitudinally of the machine as described. Also the slide 40 is adjustable upon the block 50 transversely of the machine for positioning the corner grippers for right and left crooked lasts. For this purpose the slide has a rib and groove interlocking engagement at 51 with a plate 52 the stem of which is a rack, Fig. 3, engaged by a pinion 54 which has a hand lever 55 with a spring pawl engaging a ratchet 56. The ratchet is formed rigid with and the pinion is journaled in the block 50. By this arrangement the slide 40 and the corner grippers can be initially positioned laterally or be adjusted laterally while the upper is held as provided for in the machine illustrated in said patent. The pinion 42 before described is long enough to maintain engagement with its rack on slide 40 during this transverse adjustment and the pinion 54 is made long to maintain engagement with its rack during longitudinal adjustment of the corner grippers and slide 40.

The corner grippers are arranged as described to seize the toe portion of the upper, updraw and outdraw it and hold it under tension and outspread free from wrinkles about the entire toe portion of the last for the operation of the lasting plates or wipers 60 thereon. These wipers are first moved from their elevated, out-of-the-way position which they occupy during the pulling-over operation and are closed about the toe below the shoe bottom. They are then raised while encompassing the toe and being held in rubbing contact with the upper about the side faces of the toe preparatory to wiping the upper inwardly over the shoe bottom to lasted position, these closing and raising movements being imparted manually by hand levers connected respectively with the pinions 64, 65, Fig. 2. The wipers find the tensioned upper free from wrinkles and by proper manipulation of the wipers and corner grippers the upper can be continued taut and free from wrinkles while it is being carried over the edge of the shoe bottom. For facilitating this the corner grippers are connected with a treadle 70, Figs. 1 and 2, having a rod 72 which, through a wedge face on its upper end and a slide, can at the proper time be made to trip a latch 75 by which two parts 73, 74 of the connection from cam 3 to updraw lever 20 are normally held together. The withdrawal of this latch permits the lever 20 to turn in the direction to lower the link 30 for relaxing the outdrawing pull of the corner grippers, as well as to relieve the updrawing tension on spring rod 16, to the extent of the lost motion provided between the two parts 73, 74 by the pin and slot 76, Fig. 2. This is made to occur as the wipers are raised toward or to the edge of the shoe bottom and enables the wipers to bend the upper inwardly at their edges while the grippers hold it outdrawn over the top face of the wipers as in Fig. 15.

The treadle rod also operates a bell crank 80 which has a lost motion connection to move a thrust rod 82 after the latch 75 has been withdrawn. This rod 82 extends to the front of the machine, Figs. 2 and 3, where by means of rack teeth it turns a pinion shaft 84 for moving rearwardly a slide frame 86, 87, to which a yoke 88 is pivoted at 89. The arms of this yoke are located opposite the tripping devices 204 for the corner grippers (said devices serving as explained in my earlier Patent 1,030,264 to effect opening of the grippers after a certain force has been applied). The force which must be applied before the tripping devices will open the corner grippers will be so proportioned that the grippers will first be pressed inwardly by the yoke 88, the outdraw spring 34 yielding, to allow the grippers to follow the inward movement of the wipers over the edge of the shoe bottom, Fig. 15. Finally as the wipers are moved inward to their final position with the upper lasted against the shoulder of the innersole, complete depression of treadle 70 will be made to cause the yoke 88 to open the grippers whereupon they will be raised and gathered inwardly out of the operator's way by the action of springs 16 and 34. The treadle 70 has a yielding resistance 71 under it to enable the operator more surely to depress it progressively and to hold it at the points where he may desire to pause. The pivotal mounting of yoke 88 enables it to adjust itself to the position and the resistance of the corner grippers and to insure opening of them simultaneously.

Figures 8, 9:
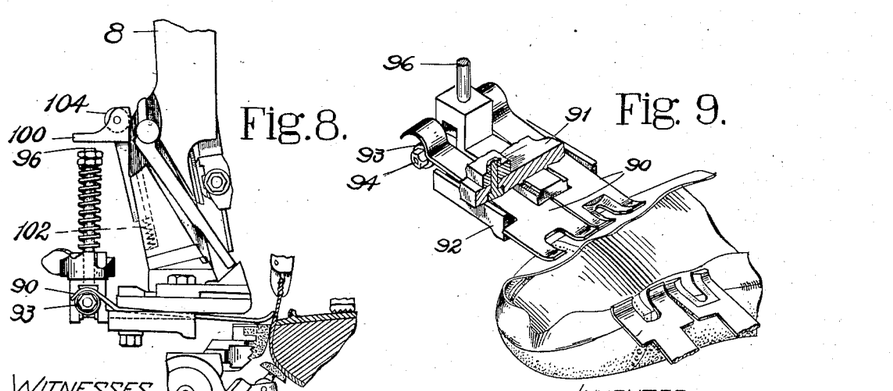

The wipers which coöperate at the sides of the forepart with the wipers 60 to lay the upper over the shoe bottom are shown best in Figs. 6, 7, 8 and 9 and are of the type covered by my earlier United States Letters Patent 988,582, granted April 4, 1911. These wipers are however divided longitudinally into two separate, relatively movable adjacent plates 90, 90 which can adapt themselves to the shape of the shoe bottom over which they are moved. These plates are guided between the lower face of the tack block 91 and a cap block 92, as shown in Fig. 9 and in use the plates fulcrum between their ends upon the lower face of the tack block. Their rear ends hook over and in use rest down upon rolls 93 which are mounted on a rod 94 that can equalize about a transverse pivotal connection 95, Fig. 7, with the lower end of a spring supported stem 96 which is carried in a rearward extension of the tack block 91 and has a spring 97 confined upon it. The lower end of the spring rests on a washer 98 having lateral arms 99 one of which forms a handle by which it can be turned and adjusted up inclined faces into one or another of a plurality of seats in the supporting face of the tack block extension for conveniently varying the tension of spring 97. When the spring is active as in Fig. 8 it holds the shoe engaging ends of the wiper plates 90 yieldingly down with a pressure determined by the adjustment of the device 98, 99. When the tack blocks and wipers 90 are retracted after operation on a shoe it is desirable to withdraw the wipers under the tack blocks to afford a maximum clearance for the shoe. Provision is therefore made for lowering the rolls 93 to allow the wiper plates to slide backward freely by their inertia when the tack arms 8 are swung out. For this purpose a sliding block 100 is mounted in the back side of the tack arm 8 to slide up and down and is lightly upheld by a spring 102. This block has an extension to overlie the end of the stem 96 and has a roll 104 which engages an inclined face on the frame of the machine at 105 Fig. 1, when the tack arm is swung out. This inclined face forces the stem 96 down and the rolls 93 out of the way of the wiper plate 90.

The last supports 120 which uphold the shoe for the action of the wipers are herein made adjustable forwardly and backwardly to position them properly for the particular work being done and for this purpose each support block 122 is pivoted at its lower, outer end at 123 and has a dovetailed, arc-shaped guideway, by which it has supporting engagement with a correspondingly shaped guide rib 124 to which it is clamped in adjusted position by screw 125, Figs. 2 and 10.

In the use of the machine a shoe is presented as it is customary to present a shoe to the pulling-over machine against the shoe bottom rest, which occupies the shoe receiving position shown in Fig. 2, from which it is depressed by a cam on the end of the driving shaft 2 to move the shoe downwardly. The relative movement of the last and grippers is necessary in order to permit the wipers to move under the grippers and over the last bottom, as in Fig. 5. In the shoe receiving position of the parts the last is centered and longitudinally positioned against the inner faces of the inner corner gripper jaws, the tip seam of the upper being positioned longitudinally of the last and also in desired angular relation to the longitudinal axis of the last by gaging from the lateral edges of the grippers, in this instance the rear edges of the rear corner grippers being preferably used for this purpose. The machine is now started and the corner grippers 24, 25 seize the upper and outdraw and updraw it as described to take out the stretch both lengthwise of the shoe and transversely of the toe. After the corner grippers the side grippers seize the upper and pull it and the machine comes to rest for inspection of the work by the operator. The operator, in addition to making any desirable ones of the adjustments heretofore provided in this machine for positioning or drafting the upper as his judgment may deem advisable, may examine the toe to see that it is in the best condition for lasting into final position by means of the wipers 60. If the upper is insufficiently stretched he may further outdraw it manually by manipulating the hand lever 45. This will stretch the upper widthwise of the toe as well as lengthwise. If lengthwise stretching is primarily the thing desired he will further updraw the upper by upward pressure on the front end of updraw arm 17. If transverse shifting of the toe portion of the upper is needed to make it fit right over the formation of the particular last over which it is being shaped then the hand lever 55 will be used. Of course either of the adjustments of the grippers by hand levers 45 or 55 may be made before the shoe is put into the machine for the purpose of adapting the corner grippers to the work that is to be done. When the position and tensioned condition of the upper is satisfactory the machine is started again and the side clamps and the side wipers and tackers are moved to operative position and actuated to do their work, the side tackers and wipers thereupon retiring while the side clamps or last supports 120 remain in holding engagement with the shoe for the toe lasting operation. The last supporters will have been previously adjusted forwardly or backwardly and secured by the binders 125 according to the shape of the shoe. When the divided side wiper plates 90, 90 advance over the shoe bottom they adjust themselves relatively, by reason of their separate formation and the equalizing pivot 95, to obtain a firm bearing on the portion of the shoe over which they are to wipe the upper inwardly to its lasted position where it is fastened by three tacks driven on each side of the shoe from the tack carriers before the tack arms 8 swing out again. As the arms swing out the stems of wiper rods 96 are forced downward, to permit full retraction of the wipers, by the engagement of the depressors 100 with the inclines 105. The machine now comes again to rest and the operator lowers the wipers 60 and closes them into toe embracing relation below the plane of the last bottom as in Fig. 13. If the work has been properly done the toe portion of the upper has been thoroughly stretched and is now held under tension and outspread entirely free from wrinkles. The last may be regarded as forming an inside die or mold member and the wipers form an outside member and are moved upwardly while held closed and conformable to the shape of the shoe as they rise. They thus smooth the upper firmly to the shape of the last until they reach the edge of the shoe bottom, the grippers 24, 25 meanwhile holding the margin of the upper outspread while the wipers bend it inwardly. When the edge of the last bottom is reached and the danger of wrinkles forming is substantially past the treadle 70 may be depressed far enough to withdraw the latch 75 and let the link 30 descend with relation to the inclined slots in the bracket 35. This allows the corner grippers to move inwardly in response to the tension on the inwardly bent upper, or in other words relieves the outdraw, after which the wipers 60 can be closed inwardly over the shoe bottom to their final position, with the corner grippers still holding the upper under a substantial degree of tension. Final depression of the treadle will now cause the yoke 88 to trip the corner grippers for releasing their hold on the stock and the upper may be fastened and then the machine restarted for releasing the shoe and restoring all the parts to position for beginning operation on another shoe.

The improvements which are herein disclosed in methods of making shoes are not claimed in this application but will form the subject-matter of a separate application.

Having thus described my invention, what I claim as new and desire to secure by Letters Patent of the United States is:—

1. A machine of the class described having, in combination, two pairs of gripper jaws arranged to engage the upper at each corner of the toe and actuating mechanism therefor arranged to impart to the corner grippers a combined outdrawing and updrawing movement.

2. A machine for working the toe portion of an upper into lasted position having, in combination, a last bottom rest, grippers separate from each other and spaced apart a substantial distance to engage the upper at each of the corners of the toe, mechanism to close the grippers and to move the grippers and the last rest relatively to pull up the upper at the corners of the toe, wipers constructed and arranged to embrace the toe and to overwipe the upper while it is held under tension by the corner grippers, mechanism for operating the wipers, and additional mechanism for relatively moving the grippers and the last to outdraw the corners of the toe portion of the upper for avoiding formation of wrinkles during the operation of the wipers.

3. A machine for working an upper over a last having, in combination, means for engaging the shoe bottom, two pairs of gripper jaws arranged to engage the upper at the two corners of the toe, and operating mechanism organized to effect relative movements of the shoe last and said gripper jaws to updraw the upper at the corners of the toe and to outdraw it in diverging directions inclined forwardly.

4. A machine for working the toe portion of an upper into lasted position having, in combination, a last bottom rest, grippers arranged to engage the upper at each of the corners of the toe, means for closing the grippers, toe embracing wipers, means for operating the wipers, and means for imparting to the corner grippers a pulling movement obliquely outwardly in diverging directions for outdrawing the corners of the toe portion of the upper, said grippers being mounted to permit them to have, while they are outdrawing, a turning movement about axes which are substantially perpendicular to the plane of the last bottom.

5. A machine for working the toe portion of an upper into lasted position having, in combination, a last bottom rest, toe embracing wipers, grippers which are arranged for pulling the upper at each corner of the toe of the last and are turned during the upper pulling operation about separate axes which are substantially perpendicular to the plane of the last bottom to spread the toe of the upper for the operation of the wipers, and operating mechanism to effect the pulling and the spreading of the upper.

6. A machine for working the toe portion of an upper into lasted position having, in combination, toe embracing wipers, grippers arranged to engage the upper at the corners of the toe, a last bottom rest, means for operating the rest to depress the last for pulling the upper, means for operating the corner grippers to draw the upper obliquely outwardly and forwardly from the corners of the toe and hold it tensioned for the closing movement of the wipers, and means for closing and advancing the wipers, said gripper operating means being constructed and arranged to permit the grippers to move inwardly to give up stock to the wipers as the wipers are closed.

7. A machine for working the toe portion of an upper into lasted position having, in combination, toe embracing wipers, grippers arranged to engage the upper at the corners of the toe, a last bottom rest, means for operating the rest to force the last away from the grippers and hold it so that the wipers can close in a plane between the last bottom and the grippers, means for moving the grippers and the last relatively to draw the upper forwardly and outwardly from the corners of the last and spread the toe end of the upper transversely of the last, and means for moving the wipers and the last relatively to effect the wiping of the upper over the bottom face of the toe of the last.

8. A machine for working the toe portion of an upper into lasted position having, in combination, toe embracing wipers, grippers arranged to engage the upper at the corners of the toe, a last rest, said rest and grippers having a normal shoe receiving position in which the rest is above the lower edge of the grippers, means for operating the grippers to seize the upper and for moving the grippers and the rest relatively to pull the upper upwardly and obliquely outwardly from each corner of the toe and hold it with the last below the grippers far enough to allow the wipers to close over the last bottom under the grippers, and means adapted for closing the wipers and relatively advancing the wipers and the last to gather the upper over the toe of the last while the upper is held tensioned by the grippers.

9. A machine of the class described having, in combination, grippers arranged to engage the upper at the corners of the toe, actuating mechanism therefor arranged to impart to the corner grippers a combined outdrawing and updrawing movement, the updrawing movement being substantially perpendicular to the last bottom, and means for directing the outdrawing movement obliquely forwardly.

10. A machine of the class described having, in combination, two pairs of gripper jaws arranged to engage the upper at two separate points at each corner of the toe, said two pairs at each corner being guided for outdrawing movement obliquely forwardly together but capable of turning about a common axis to adapt their position to the shape of the last corner, and means for effecting the outdrawing movement.

11. A machine of the class described having, in combination, corner grippers each comprising a single operating bar, two pairs of jaws carried by the bar and arranged at an oblique angle to each other to adapt them to operate at the curved corner of a last and mounted to turn together about a common axis extending lengthwise of the operating bar for self adjustment.

12. A machine of the class described having, in combination, corner grippers each comprising a single operating bar, two pairs of jaws carried by the bar mounted to turn together about a common axis extending lengthwise of the operating bar and between the pairs of jaws, means for outdrawing the corner grippers, side grippers engaging the margin of the upper adjacent to the rear jaws of the corner grippers, and means for overdrawing the side grippers and thereby, through the intervening portion of the upper margin, effecting the turning of the corner grippers about said axes in the direction to separate laterally the front pair of jaws of one corner gripper from the adjacent pair of the other corner gripper and effect transverse stretching of the central portion of the toe end of the upper.

13. A machine of the class described having, in combination, grippers arranged to engage the upper at the corners of the toe, and actuating mechanism therefor arranged to impart to the corner grippers outdrawing movements automatically, and means for guiding said grippers for said movement along diverging, forwardly directed paths which are substantially transverse to the gripping planes of their jaws.

14. A machine of the class described having, in combination, grippers arranged to engage the upper at the corners of the toe, and power operating mechanism arranged to impart to the corner grippers outdrawing movements along diverging forwardly directed paths which extend at an angle to the gripping planes of the gripper jaws.

15. A machine of the class described having, in combination, grippers arranged to engage the upper at the corners of the toe, and operating mechanism arranged to effect relative movement of the grippers and shoe bottom rest to tension the upper and to impart to the corner grippers outdrawing movements along diverging forwardly directed paths which extend at an angle to the gripping planes of the gripper jaws.

16. In a machine of the class described, the combination with a plurality of pairs of gripper jaws for engaging an upper upon each side of the median line of the last, of devices for actuating said pairs of jaws to impart outdraw, foredraw and updraw to the upper.

17. In a machine of the class described, the combination with a plurality of pairs of grippers for engaging an upper upon opposite sides of the median line of the last, of devices for automatically actuating the grippers in a direction substantially perpendicular to the plane of the last bottom and also longitudinally of the last in paths inclined obliquely forwardly and outwardly.

18. In a machine of the class described, the combination with grippers for engaging an upper upon opposite sides of the median line of the last, of devices for automatically actuating the grippers and last relatively to pull the upper in a direction substantially perpendicular to the plane of the last bottom and also longitudinally of the last in paths inclined obliquely forwardly and outwardly.

19. In a machine of the class described, the combination with a plurality of pairs of grippers for engaging the toe end of an upper on each side of the median line of the last, of means for actuating the grippers to stretch the toe end of the upper transversely as well as longitudinally of the shoe.

20. In a machine of the class described, the combination with grippers which are arranged for engaging the toe end of an upper on each side of the median line of the last, of power operated means for relatively actuating the grippers and the last to stretch the toe end of the upper transversely as well as longitudinally of the shoe.

21. In a pulling-over machine, a gripper, a last rest, means for relatively operating the gripper and the last rest to updraw the upper, and means operating independently of the extent of the updraw movement for automatically outdrawing the upper.

22. In a pulling-over machine, a gripper, an updraw lever, a yielding connection therefrom to the gripper for effecting updraw movement, and a separately yielding connection from the lever to the gripper for effecting outdraw movement.

23. In a pulling-over machine, a gripper, an unyieldingly actuated updraw lever, an updrawing arm yieldingly connected with the lever and connected with the gripper, and a link connected with the lever and with the gripper and arranged to effect outdrawing movement of the gripper.

24. In a pulling-over machine, grippers at opposite sides of the median line of the last, a lever, an updrawing arm connected to the lever and having an equalizing connection to the grippers with provision for yieldingly transmitting movement to the grippers, another connection from said grippers to the lever, and a cam device through which and said last named connection the grippers are forced yieldingly apart.

25. In a pulling-over machine relatively movable pairs of gripper jaws arranged to engage the toe end of an upper at the corners of the last, means for relatively moving said grippers and the last in a direction substantially perpendicular to the plane of the last bottom to effect longitudinal stretching of the upper, and means for moving said grippers apart in lines directed obliquely forwardly and outwardly for effecting transverse stretching of the toe end of the upper.

26. In a pulling-over machine, grippers arranged to engage the toe tip of a shoe, and side grippers arranged to engage the vamp back of the tip seam, means for actuating the tip engaging grippers to take the stretch out of the tip both transversely and lengthwise, and automatic means for thereafter actuating the side grippers to stretch the vamp transversely.

27. In a pulling-over machine, grippers arranged to engage the toe tip of a shoe, means for actuating said grippers to stretch the tip lengthwise and for also automatically actuating the said grippers relatively to one another laterally and perpendicularly to their gripping faces to stretch the tip transversely.

28. In an upper pulling machine, grippers arranged to engage the toe tip of a shoe, a last rest, means for moving said grippers and the last rest relatively to pull upwardly on the toe tip, and means for also automatically actuating the said grippers relatively to one another laterally to spread the tip transversely.

29. In a pulling-over machine, the lever 20, the equalizer lever pivotally connected therewith, and the right and left corner grippers pivotally suspended from opposite ends of the equalizer lever.

30. In a pulling-over machine, the link 30, the bracket 35 having a forwardly and upwardly inclined slot engaged by the link to swing it forwardly as the lever 20 is raised, and struts 36 connecting the link with the corner grippers.

31. In a pulling-over machine, the updraw lever 20, the arm 17 pivoted thereto and actuated yieldingly thereby, the grippers suspended from said arm, the link 30 suspended from said lever, means for controlling the path of movement transmitted to the link by the lever, and connections from the link for outdrawing the grippers.

32. A pulling-over machine having, in combination, corner grippers, connected means for updrawing and outdrawing the grippers, and separate means for further outdrawing the grippers.

33. A pulling-over machine having, in combination, corner grippers, automatic means for actuating the grippers to updraw and to outdraw the upper at the corners of the toe, and manual means arranged for optional use for additionally outdrawing the corners of the toe.

34. A pulling-over machine having, in combination, corner grippers, a last rest, automatic means for relatively moving the grippers and the last rest to updraw and to outdraw the upper at the corners of the toe, and manual means arranged for optional use for additionally outdrawing the corners of the toe.

35. A machine of the class described having, in combination, grippers arranged to engage the upper about the toe end of a last, means for actuating said grippers relatively to the last to updraw the upper and also to outdraw it obliquely forwardly and laterally away from the corners of the toe of the last to stretch the upper transversely across the toe of the last as well as longitudinally thereof, toe embracing wipers, and means for operating them to wipe the upper up the side faces of the last and inwardly toward the bottom of the toe while the grippers maintain the outdrawing strain on the margin of the upper.

36. A machine of the class described having, in combination, grippers arranged to engage the upper at the corners of the toe end of a last, means for relatively moving said grippers and the last to updraw the upper and to pull it obliquely forwardly and laterally away from the corners of the toe of the last to spread the upper transversely across the toe of the last, toe embracing wipers, and means for operating the wipers to wipe the upper inwardly toward the bottom of the toe while the grippers maintain the outdrawing strain on the margin of the upper.

37. A machine of the class described having, in combination, toe embracing wipers, and grippers operating independently of the wipers upon the toe end of the upper at a plurality of points on each side of the center of the toe to tension and outdraw the upper obliquely forwardly and laterally away from the corners of the toe of the last to stretch the upper transversely across the toe of the last as well as longitudinally thereof and to hold its edge outdrawn and under lengthwise tension while the wipers bend the upper inwardly into conformity to the contour of the side faces of the last.

38. A machine of the class described having, in combination, a last rest, toe embracing wipers, and grippers operating independently of the wipers upon the toe end of the upper at separate points on each side of the center of the toe to tension the upper substantially perpendicular to the last bottom and to outdraw the upper obliquely forwardly and laterally away from the corners of the toe of the last to spread the upper transversely across the toe of the last and to hold its edge outdrawn and under tension while the wipers bend the upper inwardly into conformity to the contour of the side faces of the last.

39. A machine of the class described having, in combination, toe embracing wipers and operating means to cause the wipers to wipe the upper up the side faces and inwardly over the bottom of the toe, and grippers operating independently of the wipers upon the upper around the toe end of the last to outdraw the upper in lines inclined upwardly and outwardly relatively to the plane of the last bottom and to the median longitudinal line of the last and to hold the upper so outdrawn under tension during the lasting operation of the wipers.

40. A machine of the class described having, in combination, toe embracing wipers, operating means to cause the wipers to wipe the upper inwardly over the bottom of the toe, grippers arranged to seize the upper at the corners of the toe end of the last, and connected power operated mechanism for causing the grippers to seize the upper and for effecting relative movement of the grippers and the last to outdraw the upper in lines inclined upwardly and outwardly relatively to the plane of the last bottom and to the median longitudinal line of the last and to hold the upper so outdrawn under tension during the overwiping movement of the wipers.

41. A machine of the class described having, in combination, toe embracing wipers and toe corner grippers, means for actuating the grippers obliquely outwardly and upwardly from the corners of the last to tension the upper and hold it outdrawn under tension, and means for actuating the wipers to wipe the upper up the sides of the last while the upper is so outdrawn and to wipe it in over the last bottom.

42. A machine of the class described having, in combination, toe embracing wipers and grippers, means for actuating the grippers in directions to take the stretch out of the toe portion of the upper both longitudinally and transversely and hold it free from wrinkles in that condition, and means to actuate the wipers to wipe it upwardly and over the toe of the last while it is so maintained free from wrinkles.

43. A machine of the class described having, in combination, toe embracing wipers and a plurality of separate grippers arranged to engage the toe end of the upper on each side of the middle, means for actuating the grippers to tension the upper longitudinally and to tension the end of the upper transversely across the toe of the last, and means for actuating the wipers to last the toe while the grippers hold it free from wrinkles.

44. A machine of the class described having, in combination, toe embracing wipers, means operating at a plurality of separate points at each corner of the toe to pull the upper obliquely upward and outward in forwardly inclined directions while the wipers are lasting the toe, and relatively yielding actuating connections through which the pulling means are moved upwardly and are moved outwardly and forwardly.

45. A machine of the class described having, in combination, toe embracing wipers arranged for upward and also for inward movements, and means to stretch the toe end of the upper lengthwise and transversely and hold it under tension in both directions for the action of the wipers.

46. A machine of the class described having, in combination, toe embracing wipers, means engaging at separate points a section of upper located at each corner of the toe of the upper, and means arranged to move the engaging means upwardly and additional means to move them apart laterally of the shoe and forwardly to tension the upper as described and hold it for the action of the wipers.

47. A machine of the class described having, in combination, toe embracing wipers, grippers for engaging the upper at each corner of the toe, means for relatively actuating the grippers and the last to updraw the upper, and means for actuating the grippers outwardly in diverging paths to outdraw the upper and transversely stretch the toe and hold it for the action of the wipers.

48. A machine of the class described having, in combination, toe embracing wipers, upper engaging means comprising jaws arranged in a series extending from one corner of the toe around the end of the toe to the other corner to receive the curved toe portion of an upper, and means for actuating the engaging means along diverging paths to outdraw and transversely stretch the toe preparatory to the action of the wipers.

49. A machine of the class described having, in combination, toe embracing wipers, upper engaging means comprising jaws arranged in a series extending from one corner of the toe around the end of the toe to the other corner to receive the curved toe portion of an upper, and arranged for movement relatively to the wipers in diverging paths inclined forwardly and outwardly to outdraw and transversely stretch the toe of the upper and hold it for the action of the wipers.

50. A machine of the class described having, in combination, toe embracing wipers, means engaging opposite corners of the toe of the upper and arranged for movement relatively to the wipers in diverging paths inclined forwardly and outwardly, and means for relatively moving the upper engaging means and the last to pull the upper upwardly and also for moving the upper engaging means along said diverging paths to spread the toe portion of the upper for the action of the wipers.

51. A machine of the class described having, in combination, toe embracing wipers, means engaging opposite corners of the toe of an upper at a plurality of points at each corner and yieldingly holding it tensioned outwardly and transversely, and means for guiding the engaging means in converging paths inclined inwardly and backwardly along which they can move to give up the upper as the toe embracing wipers work the upper into lasted position.

52. A machine of the class described having, in combination, toe embracing wipers, corner grippers, means for actuating them forwardly and outwardly, and means by which the wipers may be actuated for wiping the upper up the sides of the last and over the toe while said grippers hold the upper.

53. A machine of the class described having, in combination, toe embracing wipers, corner grippers, means for actuating them forwardly and outwardly, means by which the wipers may be actuated for lasting the toe while said grippers hold the upper, and means by which a predetermined partial relaxation of the tension of the corner grippers can be effected during the operation of the wipers at the will of the operator.

54. A machine of the class described having, in combination, toe embracing wipers, corner grippers, means for moving them forwardly and outwardly, and means by which the wipers may be operated for lasting the toe while said grippers hold the upper, said machine being constructed and arranged to permit predetermined relaxation of the tension of the corner grippers during the operation of the wipers.

55. A machine of the class described having, in combination, toe embracing wipers, grippers to tension the upper for the action of the wipers, actuating mechanism for the grippers, and additional means by which a predetermined extent of relaxation of the tension can be effected as the lasting by the wipers progresses.

56. A machine for working an upper over a last having, in combination, toe embracing wipers, means for operating the wipers, grippers arranged to engage the upper at the corners of the toe, and means for relatively moving the grippers and the last to tension the upper forwardly and to spread the toe portion of the upper for the operation of the wipers, said tensioning means being constructed and arranged for a predetermined movement to relax the pull on the upper as the wipers are closed over the toe of the shoe.

57. A machine for working an upper over a last having, in combination, toe embracing wipers, means for operating the wipers, grippers arranged to engage the upper at the corners of the toe, means for relatively moving the grippers and the last to updraw the upper, means for moving the corner grippers obliquely outwardly in diverging paths to outdraw and spread the toe, and means for closing the wipers, said machine being constructed and arranged to permit return of the grippers along said paths during the closing of the wipers to give up stock to the wipers.

58. A machine of the class described having, in combination, toe embracing wipers, grippers to tension the upper for the action of the wipers, actuating mechanism for the grippers, and additional means by which a predetermined degree of partial tension relief can be effected as the operation of the wipers progresses and then a disconnection of the grippers from the upper by further manipulation of the same means.

59. A machine of the class described having, in combination, grippers, power operated mechanism for actuating the grippers to pull an upper and come to rest holding the upper under tension, said mechanism comprising elements capable of limited relative movement and normally held together by a latch, and means adapted for manipulation by the operation while the upper continues under tension for withdrawing the latch to permit such limited relative movement for partially relaxing the pull.

60. A machine of the class described having, in combination, grippers engaging an upper at opposed portions of a last, power operated mechanism for actuating the grippers to pull the upper and come to rest holding the upper under tension, and means adapted for manual manipulation to cause a predetermined partial relaxation of said grippers.

61. A machine for working an upper over a last having, in combination, grippers arranged to engage the upper at the toe of the last, toe lasting means, mechanism for operating the grippers and the last relatively to pull the upper and hold the upper under tension, toe embracing wipers, means for operating the wipers to last the toe portion of the shoe, and means to cause, during the lasting operation, a predetermined relaxation of the tension under which the grippers hold the upper.

62. A machine of the class described having, in combination, grippers, power operated mechanism for actuating the grippers to pull an upper and come to rest holding the upper under tension, including the two part updraw operating slide 73, 74 having a lost motion connection 76 and a latch 75 normally connecting said parts, and a treadle for withdrawing the latch.

63. A machine of the class described having, in combination, grippers engaging an upper at opposed portions of a last, power operated mechanism for actuating the grippers to pull the upper and come to rest holding the upper under tension, including gripper tripping devices 204, and connected means 88, 87, 86, 84, 82, 72, 70 for manually tripping the devices 204 for both grippers simultaneously.

64. A machine of the class described having, in combination, grippers, power operated mechanism for actuating the grippers to pull an upper and come to rest holding the upper under tension including a tripping device 204 adapted for opening the grippers while they are under tension, a treadle and connections for operatively engaging the tripping device to open the grippers independently of the power operating mechanism.

65. A machine of the class described having, in combination, grippers engaging an upper at opposed portions of a last, power operated mechanism for actuating the grippers to pull an upper and come to rest holding the upper under tension, including tripping devices 204 for each gripper adapted for opening the grippers while the upper is under tension, and means movably mounted to press equally upon the two tripping devices and arranged for operation by bodily force of the workman to open both grippers simultaneously and independently of the power mechanism.

66. A machine of the class described having, in combination, grippers engaging an upper at opposed portions of a last, power operated mechanism for actuating the grippers to pull an upper and come to rest holding the upper under tension, and a single manually controlled means by which both said grippers may be lowered alike a predetermined distance to relieve the tension on the upper partially, and connections arranged to trip off both the grippers simultaneously by a further movement of said manually controlled means.

67. A machine of the class described having, in combination, grippers, power operated mechanism for actuating the grippers to pull an upper and come to rest holding the upper under tension, and means by which to effect first a predetermined extent of bodily depression of the gripper to relieve partially the tension on the upper and, by a further movement unaccompanied by a further depression of the gripper, to trip off the gripper.

68. A machine of the class described having, in combination, grippers for engaging the toe portion of an upper, side grippers for engaging the sides of the vamp, and power operating means for said grippers including means for closing the grippers, moving them to pull the upper and for opening the side grippers while the toe grippers continue to hold the upper, and treadle operated means for effecting subsequent opening of the toe grippers at the will of the operator.

69. A machine of the class described having, in combination, grippers for engaging the toe portion of an upper, power mechanism for operating said grippers including means for updrawing the upper, and means for outdrawing the upper, and manual means for relieving the outdrawing tension while continuing the updrawing pull.

70. A machine of the class described having, in combination, a plurality of grippers arranged substantially perpendicular to the plane of the last bottom, and actuating mechanism to cause them to automatically grip the toe of an upper and outdraw it in lines extending obliquely forwardly and outwardly from either side of the median line of the shoe.

71. A machine of the class described having, in combination, a plurality of grippers having jaws inclined outwardly and upwardly relatively to the plane of the last bottom, and one power-operated mechanism to cause them to grip the toe of an upper and move relatively to outdraw it in lines extending obliquely forwardly and outwardly from either side of the median line of the shoe.

72. A machine of the class described having, in combination, a gripper arranged for automatically gripping and outdrawing the toe portion of an upper and manually operated means for varying the outdrawing pull independently of the updrawing pull.

73. A pulling-over and last machine having, in combination, grippers, and mechanism for actuating them to pull an upper and come to rest with the upper under tension around a last, toe embracing wipers, a hand lever to close the wipers to embrace the shoe, a hand lever to raise the wipers to wipe up the side of the shoe, and a foot treadle to control the action of the grippers upon the upper as the operation of the wipers progresses.

74. A machine of the class described having, in combination, grippers to pull an upper over a last, tackers for fastening the upper, and means for upholding the shoe for the action of the tackers, said means comprising arms occupying a constant position longitudinally of the shoe, and last supporters adjustable on the arms to different longitudinal positions.

75. A machine of the class described having, in combination, grippers to pull an upper over a last, tackers for fastening the upper, and means for upholding the shoe for the action of the tackers, said means comprising the bar 122, pivoted at 123 to swing lengthwise of the shoe and guided and secured in adjusted position at 125.

76. A machine of the class described having, in combination, grippers to pull an upper over a last, tackers for fastening the upper, and wipers to lay the upper over upon each side of the shoe and hold it between the release by the grippers and the fastening by the tackers, said wipers each comprising two plates separated longitudinally and mounted for relative movement to adapt themselves to the contour of the last.

77. In a machine of the class described, the combination with a carrier, of wipers comprising a plurality of sections mounted thereon for tilting and longitudinal movements relatively, and a single yielding means for resisting said tilting and longitudinal movements.

78. In a machine of the class described, the combination with a carrier, of wipers comprising a plurality of sections mounted thereon for tilting and longitudinal movements relatively, and a single yielding means arranged to resist equally said movements of the two wiper sections.

79. In a machine of the class described, the combination with a carrier, of the divided wiper having the sections 90, 90 mounted to tilt and to move longitudinally in the carrier and the yieldingly supported stem 96 and equalizing rod 94 arranged to resist movement of the wiper sections.

80. In a machine of the class described, the combination with a carrier movable toward and from the shoe, a wiper mounted thereon for tilting and longitudinal movements, and means for resisting said movements, of means becoming operative automatically as the wipers moves away from the shoe to render said resisting means inoperative.

81. In a machine of the class described, the combination with a carrier movable toward and from the shoe, a wiper mounted thereon for tilting and longitudinal movements, and means for resisting said movements, of means into engagement with which the carrier comes in its outward movement and which frees said resisting means from engagement with the wipers and allows the wipers to slide backward by their inertia as the carrier comes to rest in its outermost position, substantially as described.

82. In a machine of the class described, the combination with a carrier movable toward and from a shoe, a wiper mounted thereon with capacity for movement relatively thereto, of a yielding member by which such relative movement is resisted and a rotatable wedge block having position-maintaining faces and an actuating member by which the resistance of the yielding member is adjustably controlled.

83. In a machine of the class described, the combination with a carrier and a wiper mounted thereon for longitudinal and tilting movements, of a yielding element adapted to coöperate with a suitably formed face on the wiper for yieldingly resisting both said movements of the wiper, a rod on which said yielding element is carried, and a rotatable member between which and the rod are located inclined faces up and down which said member can be adjusted for varying the resistance offered by the yielding member to said movements of the wiper.

84. A machine of the class described, having, in combination, grippers engaging an upper at the toe of a last, mechanism for actuating the grippers to pull an upper and come to rest holding the upper under tension, toe embracing wipers, means for operating the wipers to last the toe portion of the upper, and means adapted for manual manipulation during the lasting operation to cause a predetermined partial relaxation of the tension under which said grippers hold the upper.

85. A machine of the class described having, in combination, a plurality of grippers arranged for operation about the forepart of a last, two pairs of said grippers being located at each corner of the last, and actuating mechanism to impart to the corner grippers updraw and also foredraw movements in paths inclined obliquely, forwardly and outwardly from the median longitudinal line of the last.

86. In a machine of the class described, the combination with a plurality of grippers arranged in close juxtaposition to engage a section of upper extending around the forepart of a shoe, including corner grippers, of actuating means for relatively moving the grippers and the last to updraw the upper at the corners of the toe, and means for outdrawing said corner grippers along diverging, forwardly directed paths.

87. In a machine of the class described, the combination with a last bottom rest and a plurality of grippers arranged around the toe of the last to engage a section of upper extending from a point on one side of a shoe around the toe to a point on the opposite side, some of said grippers being located at the corners of the toe, of means for relatively moving the corner grippers and the last to pull the upper in a direction substantially perpendicular to the plane of the last bottom and for also actuating the corner grippers longitudinally of the last along diverging, forwardly directed paths.

88. In a machine of the class described, the combination with a last bottom rest and a plurality of grippers arranged around the toe of the last to engage a section of upper extending from a point on one side of a shoe around the toe to a point on the opposite side, some of said grippers being located at the corners of the toe, of means for relatively moving the last and the grippers to updraw the upper, and means for additionally moving the corner grippers in forwardly diverging paths.

89. In a machine of the class described, the combination with a last bottom rest and a plurality of grippers arranged around the toe of the last to engage a section of upper extending around the forepart of a shoe, two pairs of said jaws being located at each corner of the toe, of actuating means to impart to the corner gripper jaws updraw movements, and also movements in outwardly diverging paths.

90. In a machine of the class described, the combination with grippers located at the corners of the toe of a last, of actuating mechanism to cause said grippers to seize and outdraw the upper, wipers to engage the upper while it is under gripping tension, and manual means to effect a release of the tension while the wipers advance, to then press the grippers inwardly over the shoe bottom, and thereafter to effect opening of the grippers to permit them to be raised by their actuating mechanism.

91. A machine for working an upper over a last having, in combination, a last rest, toe lasting wipers, toe pulling grippers, means for moving the grippers and the last rest relatively to tension the upper and hold it for the action of the toe lasting wipers, and a treadle and connections through which the toe pulling grippers may be caused to relax the tension with which the upper is held after the wipers have come into engagement with the upper around the toe.

92. A machine for working an upper over a last having, in combination, a last rest, upper pulling means including a power-operated toe gripper arranged to come to rest holding the upper under tension for inspection, and a treadle and connections by which the tension with which the upper is held can be changed independently of the power means.

93. A machine for working the toe portion of an upper over a last having, in combination, toe embracing wipers, a gripper arranged to hold the upper spread outwardly over the wipers while the wipers are closed, and treadle operated means for moving the gripper to control the stock during the wiping operation.

94. A machine for working the toe portion of an upper over a last having, in combination, toe embracing wipers, corner grippers arranged to hold the upper spread outwardly over the wipers while the wipers are closed, and leg or foot operated means adapted for controlling the grippers during the wiping operation to cause them to give up stock to the wipers.

95. A machine for working the toe portion of an upper over a last having, in combination, toe embracing wipers, and power-operated means for seizing the upper at the corners of the toe and holding the upper updrawn and outdrawn from the corners of the toe of the last across the edge of the wipers, said means being constructed and arranged for movement to give up stock to the wipers as the wipers are closed and advanced during their lasting operation.

96. A shoemaking machine having, in combination, a plurality of toe grippers relatively movable apart, each of which is formed in sections and is also movable about a separate axis extending substantially perpendicular to the shoe bottom, and means to operate said grippers.

97. A shoemaking machine having, in combination, a rest for the bottom of a shoe, a plurality of toe grippers relatively movable apart, each of which is formed in sections and is also movable about a separate axis extending substantially perpendicular to the shoe bottom; and operating mechanism including means for causing the grippers to seize the upper and for relatively moving the grippers and rest to updraw the upper, and means arranged to move the grippers apart in forwardly diverging directions.

98. A shoemaking machine having, in combination, grippers formed in relatively movable sections and arranged to engage an upper around the toe of a last, grippers arranged to engage the upper at the sides of the last, a bracket in which the side grippers are guided for in and out movement, a slide adjustable transversely of the machine relatively to said bracket and in which the toe gripper sections are guided for in and out movement relatively in diverging paths, and means for effecting such movement of the toe gripper sections arranged to operate similarly in different transverse adjustments of the toe grippers by their slide.

In testimony whereof I have signed my name to this specification in the presence of two subscribing witnesses.

RONALD F. McFEELY.

Witnesses:
CHARLES H. HOYT,
BARTHOLOMEW T. McDONOUGH.

Copies of this patent may be obtained for five cents each, by addressing the "Commissioner of Patents, Washington, D. C."

It is hereby certified that in Letters Patent No. 1,189,979, granted July 4, 1916, upon the application of Ronald F. McFeely, of Beverly, Massachusetts, for an improvement in "Machines for Working Uppers Over Lasts," errors appear in the printed specification requiring correction as follows: Page 10, line 5, claim 59, for the word "operation" read *operator;* page 11, line 13, claim 73, for the word "last" read *lasting;* and that the said Letters Patent should be read with these corrections therein that the same may conform to the record of the case in the Patent Office.

Signed and sealed this 30th day of January, A. D., 1917.

[SEAL.]

F. W. H. CLAY,
*Acting Commissioner of Patents.*

Cl. 12—4.